A. BOECLER.
MACHINE FOR THE PRODUCTION OF RUBBER COATED TEXTURES.
APPLICATION FILED JAN. 26, 1920.

1,358,614.

Patented Nov. 9, 1920.

Inventor
Albert Boecler
by
Att'y.

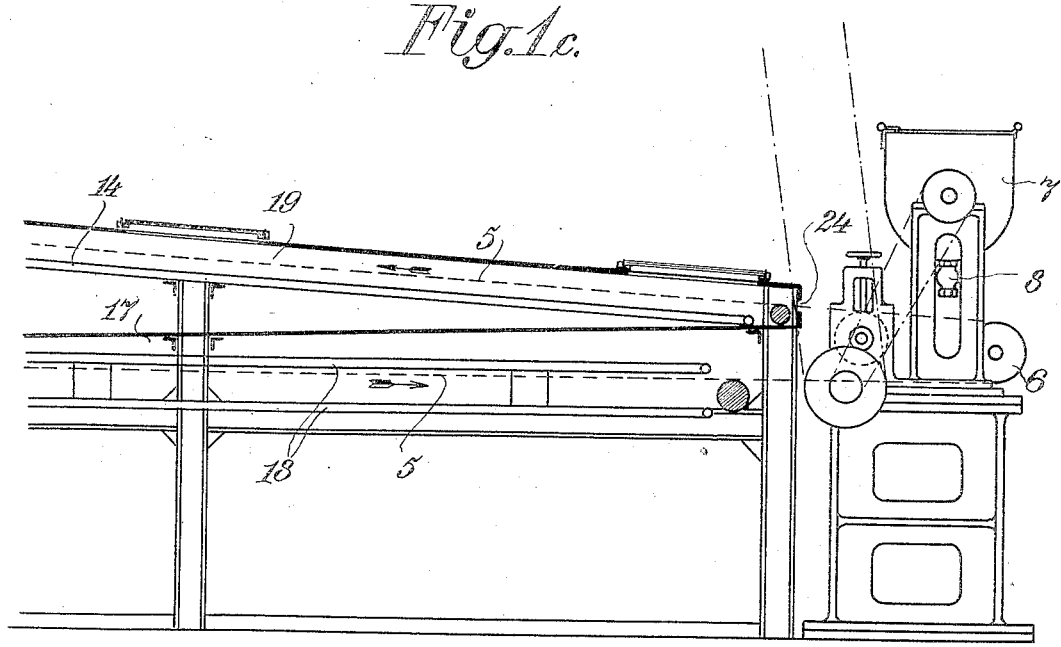

UNITED STATES PATENT OFFICE.

ALBERT BOECLER, OF MALMÖ, SWEDEN.

MACHINE FOR THE PRODUCTION OF RUBBER-COATED TEXTURES.

1,358,614.  Specification of Letters Patent.  Patented Nov. 9, 1920.

Application filed January 26, 1920. Serial No. 354,164.

*To all whom it may concern:*

Be it known that I, ALBERT BOECLER, a citizen of Germany, residing at Malmö, in the county of Malmöhus, Kingdom of Sweden, have invented a new and useful Improvement in Machines for the Production of Rubber-Coated Textures, of which the following is a specification.

My invention relates to an improvement in machines for the production of rubber coated textures, mainly for use in the manufacture of balata belts but applicable also for other purposes.

It is the main object of the invention to construct the machine in such a manner that a texture coated on both sides can be obtained in continuous working by a machine of the smallest possible size.

Previously it has been proposed to produce such rubber coated textures by applying a rubber mixture (preferably a solution of rubber in benzene) at the one side thereof and then passing the coated sheet over a heating surface whereafter the same has been left to dry in the air, but to get the texture coated on both sides the sheet must pass through the machine twice or through two different machines both of the same construction, whereat the sheet must be perfectly dried and turned before passing the second time or the second machine. As the coating, when left to dry in the air, dries comparatively slowly it has been impossible to use such machines in continuous working.

According to my present invention I make use of the known method for coating the texture sheet, but the machine is provided with artificial cooling means and built up in such a manner, better described below, that the sheet after having been passed through the same has been coated on both sides and perfectly dried, so that it can be used at once for the further manufacture of balata belts or the like.

Figure 1A:
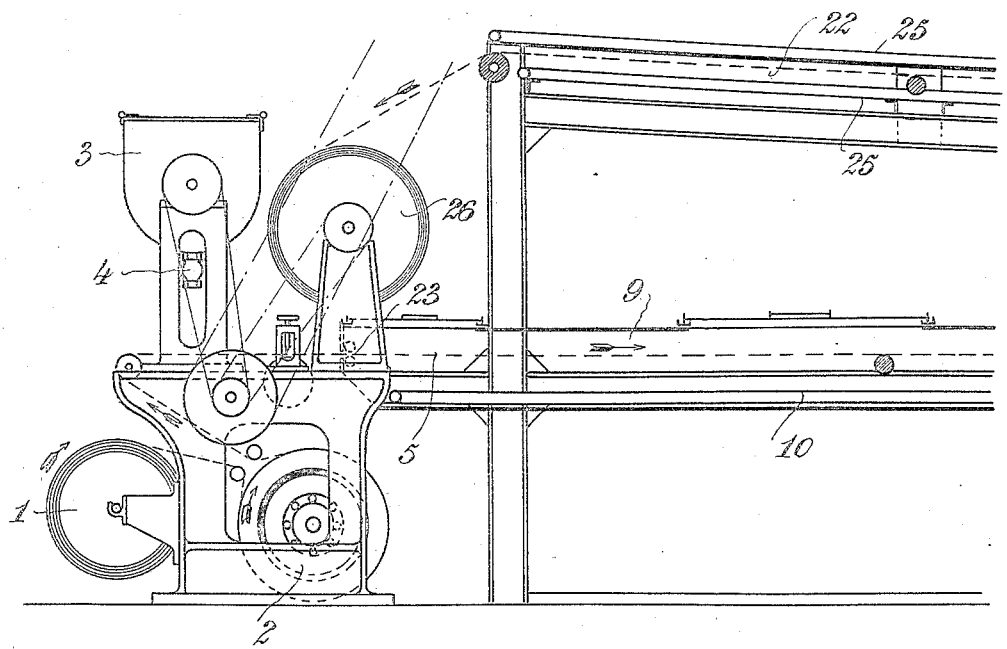
Figure 1B:
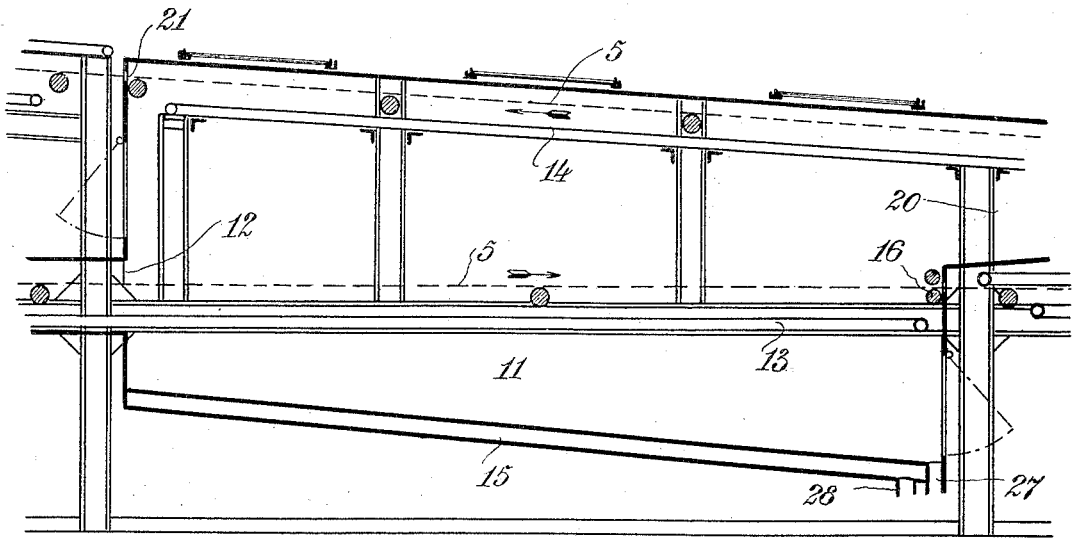
Figure 2:
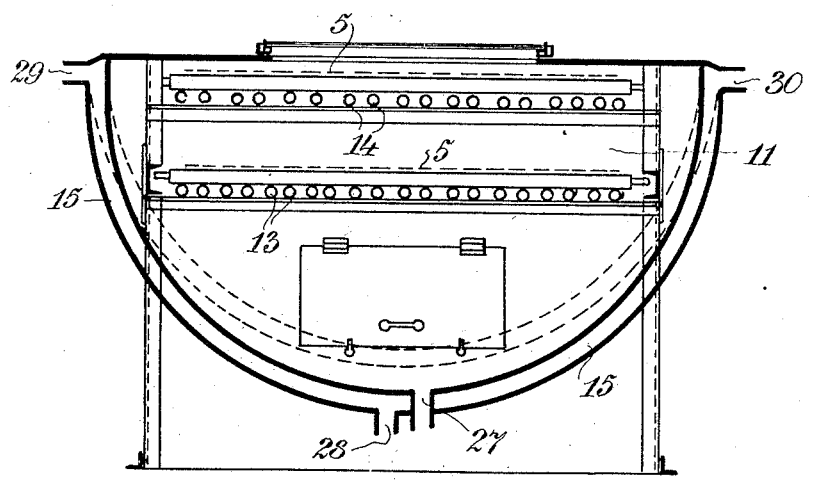

The invention is diagrammatically shown in the accompanying drawings wherein the Figures 1ª, 1ᵇ and 1ᶜ together show the machine in side elevation. Fig. 1ª shows the feeding and delivering end of the machine, Fig. 1ᵇ the central part or evaporating chamber and Fig. 1ᶜ the turning end thereof. Fig. 2 shows a cross section of the evaporating chamber shown in Fig. 1ᵇ.

The parts of the machine, in which the rubber coating is applied to the sheet are previously known and need not be described in detail in this connection.

The first coating machine (Fig. 1ª) consists of a storage roller 1, a heating drum 2 and a heated mixing device 3 containing the rubber mixture and provided with valves 4 for applying said mixture to the one side of the sheet 5, which is fed through the coating device around suitably placed rollers. The second coating device (Fig. 1ᶜ) is constructed mainly in the same manner but has neither storage roller nor heating drum. It is provided with a turning roller 6 and a heated mixing device 7, the bottom of which carries valves 8 for applying the rubber mixture to the other side of the sheet. The novel and improved parts of the machine are to be found between these two devices for applying the rubber coating to the sheet, and said coating devices need not necessarily be constructed in the manner described, but may vary with regard to the construction, although the known devices referred to are found to be excellent for the purpose.

According to the invention the sheet 5 passing from the first coating device (Fig. 1ª) is carried through a preheating chamber 9 provided with radiators preferably in the form of steam pipes 10, and therefrom the sheet is passed to the evaporating chamber 11, which is in free communication with the preheating chamber 9 at the place of connection 12 between said chambers. The evaporating chamber 11 contains two sets of radiators 13 and 14 and the sides and bottom thereof are carried out in the form of cooling jackets 15 (Figs. 1ᵇ and 2). From the evaporator 11 the sheet 5 passes through a small opening 16 to a cooling chamber 17 containing artificial cooling means such as cooling pipes 18 or jackets preferably on both sides of the sheet, and from there it goes to the second coating device (Fig. 1ᶜ). When arriving at said device the sheet is coated on one side and is perfectly dry and hard so that it will not stick to the roller 6 when turning around the same.

The sheet passes further under the valves 8, whereat the other side thereof is coated with rubber solution, and thereafter it goes to a preheating chamber 19 arranged above the cooling chamber 17 and insulated therefrom in a satisfactory manner. The preheating chamber 19 is by a large opening 20 in free communication with the evaporator 11, and the radiators 14 arranged therein extend into the preheating chamber 19, which forms a prolongation of the evaporator in the same manner as the preheating chamber 9 described above. Separate radiators can of course be used for the preheating chamber 19 as described with regard to the chamber 9, and in the chamber last mentioned the radiators can be carried out in the form of extensions from the radiators 13 arranged in the evaporator if desired.

From the preheating chamber 19 the sheet passes back to the main evaporator 11 and from there through a small opening 21 to a cooling chamber 22 arranged above the preheating chamber 9 and insulated therefrom. The inlet 23 (Fig. 1$^a$) to the chamber 9 and the corresponding inlet 24 (Fig. 1$^c$) to the chamber 19 are of but a small size, i. e., sufficient for passing of the sheet only, and thus the vapors formed in the evaporator are prevented from escaping to the surroundings.

The cooling chamber 22 is also provided with artificial cooling means such as cooling pipes or jackets 25 preferably on both sides of the sheet and after leaving said chamber the sheet is perfectly dried again and coated on both sides. This product is rolled up at 26 and can at once be used for the further manufacture of for instance balata belts. The rapid cooling process obtained by means of the cooling devices referred to above prevents the rubber coating from being vulcanized, and after leaving the machine the product is quite fitted for the further manufacture of for instance balata belts.

Although the cooling means of the machine above have been described as chambers, it is evident that the cooling pipes or the like need not be surrounded by any walls, but may be mounted on the frame work of the machine without casings of any kind, as no vapors are given off from the sheet during its passage over the cooling surfaces. Further it will be understood that although the preheating chambers have been described as separate chambers they are to be considered as extensions of the main evaporator only in order to facilitate the evaporation and to make it possible to run the machine with a greater speed. Thus practically only a single evaporator is used and thereby the size of the machine is diminished.

During the whole passage through the machine the sheet travels on suitable arranged rollers or the like and a suitable number thereof may be power driven if desired.

The cooling jacket 15 of the evaporator 11 serves for the purpose of recovering the solvent evaporated. The vapors of for instance benzene have a greater specific gravity than air and therefore they sink to the bottom of the evaporator, strike the side walls and bottom thereof and are condensed, whereafter the fluid is drawn off through the outlet 27 (Fig. 2). The inlet or inlets 28 to the water jacket 15 are placed at the bottom of the same and said jacket is provided with two or more outlets 29, 30 arranged at the opposite upper edges thereof. Provided that the outlet or outlets at the one side, for instance 29, is of a smaller diameter—say $\frac{1}{2}''$—than the other or others, for instance 30, which is $\frac{3}{4}''$, the water circulation in the right part of jacket will be more rapid than in the left part and consequently the part first mentioned has the lowest temperature. The vapors formed in the evaporator therefore get a circulating movement, i. e., they sink at the colder side and rise at the side being not so cold. Thus no vapors can be at rest above the parts of the sheet present in the evaporator.

What I claim is:

1. A machine for the production of textures rubber coated on both sides in continuous working comprising a heating chamber for evaporating the solvent of the rubber mixture placed in the middle of the machine, two cooling devices, each of which is placed adjacent to the opposite ends of said evaporating chamber, two power driven coating devices placed in such a way that the texture may be passed therethrough before entering the evaporating chamber, one of said coating devices being provided with a turning roller, which turns the texture upside down before passing the other coating device, all of the parts of the machine being provided with rollers for guiding the texture through the machine, in such a way that it after leaving the first coating device enters the evaporating chamber and therefrom passes to one of the cooling devices, thereafter is turned upside down and passed through the other coating device, from which it again enters the evaporating chamber and therefrom goes to the other cooling device.

2. A machine of the character described comprising an evaporating chamber placed in the middle of the machine and provided with two heating surfaces placed inside of said chamber and a cooling surface placed adjacent to the bottom and side walls thereof, two cooling devices placed adjacent to the opposite ends of said chamber, two power driven coating devices placed in such a way that the texture may be passed therethrough before entering the evaporating chamber, one of said coating devices being provided with a turning roller and all of the parts of the machine with guide rollers for guiding the texture through the machine in the desired manner, some of which rollers may be power driven if desired.

3. A machine of the character described comprising an evaporating chamber placed in the middle of the machine and provided with two heating surfaces arranged inside the chamber one above the other and a cooling surface adjacent to the bottom and side walls thereof, said evaporating chamber being also provided with extensions at both ends, which extensions for preheating chambers placed between the evaporating chamber and two power driven coating devices arranged at the opposite ends of the machine, an artificial cooling device being placed above one of said preheating chambers at one end of the machine and another artificial cooling device being placed beneath the preheating chamber arranged at the other end of the machine all of the parts of the machine being provided with guide rollers for guiding the texture through the machine in the desired manner.

4. In a machine of the character described comprising an evaporating chamber placed in the middle of the machine and provided with heating surfaces inside of said chamber arranged one above the other and a cooling jacket surrounding the bottom and side walls thereof, said jacket being provided with an inlet at the bottom and a number of outlets arranged at the upper edges of the separate side walls the outlets at one side also being of a smaller area than those of the other, two extensions in free communication with the evaporating chamber and forming preheating chambers placed between the ends thereof and two power driven coating devices arranged at the opposite ends of the machine, one of which devices being provided with a turning roller, an artificial cooling device placed above one of said extensions and another artificial cooling device placed beneath the other, each of which cooling devices consisting in two cooling surfaces arranged at the opposite sides of the sheet, small passages being provided for feeding the texture to be coated through the evaporating chamber and all of the parts of the machine being provided with guide rollers for guiding the texture through the machine in the desired manner.

In testimony whereof, I have signed my name to this specification in the presence of two subscribing witnesses.

ALBERT BOECLER.

Witnesses:
H. BRANZELL,
FRED. FLERON.